United States Patent
Li et al.

(10) Patent No.: US 12,294,864 B2
(45) Date of Patent: May 6, 2025

(54) IN-FIELD REMOTE PROFILE MANAGEMENT FOR WIRELESS DEVICES

(71) Applicant: Apple Inc., Cupertino, CA (US)

(72) Inventors: Li Li, Los Altos, CA (US); Aurelien P. Raboisson, Torrance, CA (US); Avinash Narasimhan, Fremont, CA (US); George Lin, San Jose, CA (US); Keizo Marui, New Dundee (CA)

(73) Assignee: Apple Inc., Cupertino, CA (US)

( * ) Notice: Subject to any disclaimer, the term of this patent is extended or adjusted under 35 U.S.C. 154(b) by 246 days.

(21) Appl. No.: 17/661,277

(22) Filed: Apr. 28, 2022

(65) Prior Publication Data

US 2023/0354040 A1    Nov. 2, 2023

(51) Int. Cl.
*H04W 12/72*    (2021.01)
*H04W 8/18*    (2009.01)
*H04W 12/0431*    (2021.01)
*H04W 12/069*    (2021.01)

(52) U.S. Cl.
CPC ........... *H04W 12/72* (2021.01); *H04W 8/183* (2013.01); *H04W 12/0431* (2021.01); *H04W 12/069* (2021.01)

(58) Field of Classification Search
CPC ... H04W 12/72; H04W 12/069; H04W 12/06; H04W 8/183; H04L 63/0853; H04L 63/0823; H04L 63/08; H04L 9/3268; H04L 67/34
See application file for complete search history.

(56) References Cited

U.S. PATENT DOCUMENTS

| | | | |
|---|---|---|---|
| 2012/0108207 A1* | 5/2012 | Schell | H04W 12/35 455/411 |
| 2017/0222991 A1* | 8/2017 | Yang | H04L 9/0825 |
| 2019/0007835 A1* | 1/2019 | Li | H04W 12/069 |
| 2020/0021993 A1* | 1/2020 | Yang | H04L 63/123 |
| 2020/0169869 A1* | 5/2020 | Finger | H04L 9/0825 |
| 2020/0178070 A1* | 6/2020 | Yang | H04W 8/245 |
| 2020/0344594 A1* | 10/2020 | Larignon | H04W 12/42 |
| 2020/0351656 A1* | 11/2020 | Johansson | H04W 4/70 |
| 2022/0046408 A1* | 2/2022 | Kang | H04W 8/183 |
| 2022/0264284 A1* | 8/2022 | Kang | H04W 12/35 |
| 2022/0295276 A1* | 9/2022 | Yang | H04L 9/3271 |
| 2023/0319573 A1* | 10/2023 | Li | H04W 12/041 726/9 |

* cited by examiner

*Primary Examiner* — Tae K Kim
(74) *Attorney, Agent, or Firm* — DICKINSON WRIGHT RLLP (57) ABSTRACT

The described embodiments set forth techniques for management of electronic subscriber identity module (eSIM) profiles for a wireless device, including in-field replacement of provisioning (bootstrap) eSIM profiles. Public key infrastructure (PKI) information for an original equipment manufacturer (OEM) profile management server is installed in an embedded universal integrated circuit card (eUICC) of a wireless device at a time of manufacture and used subsequently by the wireless device to conduct an eSIM profile management session and verify authorization of the OEM profile management server to manage, e.g., update and/or replace, one or more eSIM profiles on the eUICC of the wireless device.

20 Claims, 9 Drawing Sheets

IN-FIELD REMOTE PROFILE MANAGEMENT FOR WIRELESS DEVICES

FIELD

The described embodiments set forth techniques for management of electronic subscriber identity module (eSIM) profiles for a wireless device, including in-field replacement of provisioning (bootstrap) eSIM profiles.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices. Additionally, some cellular-capable wireless devices, such as wearable wireless devices, home automation Internet of Things (IoT) wireless devices, and cellular wireless equipped vehicles may not support UICCs.

Profiles, including provisioning (bootstrap) eSIM profiles with limited functionality and eSIM profiles with full cellular service capability, can be downloaded to an eUICC of a mobile device from a network-based server. One or more provisioning eSIM profiles can be preloaded to an eUICC of a wireless device during manufacture of the target wireless device. The preloaded provisioning eSIM profiles on the eUICC can be used to subsequent download fully functional eSIM profiles. Replacement of a provisioning eSIM profile can be required, such as when information in the provisioning eSIM profile is outdated or a different provisioning eSIM profile is preferred for use by the manufacturer of the wireless device. Prior art methods to replace a provisioning eSIM profile requires interacting with an associated mobile network operator (MNO) to delete the provisioning eSIM profile prior to obtaining a new provisioning eSIM profile from another MNO, which increases complexity of eSIM profile management. There exists a need to replace (or more generally manage) eSIM profiles, including provisioning eSIM profiles, on an eUICC with minimal interaction with associated MNOs to reduce profile management complexity and improve efficiency.

SUMMARY

The described embodiments set forth techniques for management of electronic subscriber identity module (eSIM) profiles for a wireless device, including in-field replacement of provisioning (bootstrap) eSIM profiles. Public key infrastructure (PKI) information for an original equipment manufacturer (OEM) profile management server is installed in an embedded universal integrated circuit card (eUICC) of a wireless device at a time of manufacture and used subsequently by the wireless device to conduct an eSIM profile management session and verify authorization of the OEM profile management server to manage, e.g., update and/or replace, one or more eSIM profiles on the eUICC of the wireless device.

The wireless device establishes an eSIM profile management session with the OEM's profile management server in response to a push notification or polling result indicating pending management for one or more eSIM profiles on the eUICC of the wireless device. The wireless device sends a profile message to the profile management server, the profile message including i) a session identifier obtained from the profile management server for the eSIM profile management session and ii) a list of one or more eSIM profiles on the eUICC of the wireless device. In some embodiments, the list of eSIM profiles includes indications of provisioning eSIM profiles installed on the eUICC of the wireless device. The wireless device receives, in response from the profile management server, a profile management request message including instructions for management of at least one eSIM profile of the one or more eSIM profiles on the eUICC of the wireless device. In some embodiments, the instructions include management commands to replace at least one eSIM profile, e.g., a provisioning eSIM profile, on the eUICC of the wireless device. A new eSIM profile can be downloaded and installed on the eUICC of the wireless device before deleting the at least one eSIM profile from the eUICC of the wireless device. In some embodiments, the new provisioning eSIM profile and the replaced (old) provisioning eSIM profile are associated with different mobile network operators (MNOs). In some embodiments, the wireless device installs a new provisioning eSIM profile associated with a first MNO and after deletion of a previously installed (old) provisioning eSIM profile notifies a second MNO associated with the deleted provisioning eSIM profile. The wireless device uses PKI information for the profile management server installed at the time of manufacture, e.g., a certificate and an associated server public key, to verify authenticity of messages from the profile management server and to verify authorization of the profile management server to perform operations indicated by the management instructions for the one or more eSIM profiles on the eUICC of the wireless device. Different certificates associated with different sets of allowed eSIM management operations can be generated for the profile management server and installed in different types of wireless devices. In some embodiments, a first certificate can be installed in a first type of wireless device, such as a mobile wireless device, and allow for replacement of provisioning eSIM profiles, while a second certificate can be installed in a second type of wireless device and allow for enabling and disabling eSIM profiles, such as on an Internet of Things (IoT) wireless device.

Other aspects and advantages of the present disclosure will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for management of electronic subscriber identity module (eSIM) profiles for a wireless device, including in-field replacement of provisioning (bootstrap) eSIM profiles. Wireless devices that support electronically downloadable profiles, e.g., i) on-demand eSIMs or ii) one or more limited functionality provisioning (bootstrap) eSIMs for initialization and subsequent loading of fully functional cellular eSIMs on an eUICC, are becoming more prevalent. An original equipment manufacturer (OEM) of the wireless device may have the flexibility to load provisioning eSIM profiles and/or mobile network operator (MNO) eSIM profiles during manufacture, assembly, and/or testing of the wireless device at an OEM manufacturing facility. Subsequently, after delivery of the wireless device to a user, in-field management of the eSIM profiles, including management of one or more provisioning eSIM profiles, on the eUICC of the wireless device can occur. Updating or replacing a provisioning eSIM profile can be required based on changes required by an MNO associated with the provisioning eSIM profile or based on changes instituted by the OEM of the wireless device. For example, a new or updated roaming agreement of an MNO can change a public land mobile network (PLMN) preferred priority list for PLMN search and PLMN connections that requires updating after shipment of the wireless device. In some circumstances, the OEM of the wireless device can elect to replace an installed provisioning eSIM profile, associated with a first MNO, with a new provisioning eSIM profile, associated with a second MNO different from the first MNO. The OEM of the wireless device can maintain a profile management server that manages one or more eSIM profiles on the eUICC of the wireless device. Public key infrastructure (PKI) information associated with the profile management server, such as a certificate and a server public key $PK_{server}$, can be installed in the eUICC of the wireless device at a time of manufacture. The eUICC of the wireless device uses the PKI information to verify authenticity of messages received from the profile management server, e.g., based on signatures that accompany the messages and generated by the profile management server using a server private key $SK_{server}$, and to verify authorization of the profile management server to perform (or cause the wireless device to perform) management operations on one or more eSIM profiles indicated in one or more messages communicated during an eSIM profile management session established between the wireless device and the profile management server. The profile management server can use PKI information having a Global System for Mobile Association (GSMA) certificate issuer (CI) root of trust to verify authenticity of messages received from the wireless device, where the messages include signatures generated by an eUICC of the wireless device based on an eUICC private key $SK_{eUICC}$. In some embodiments, distinct certificates for the profile management server can be used for different types of wireless devices, each certificate including a set of eSIM profile management operations permitted for the profile management server to perform on one or more eSIM profiles of a wireless device of a particular type. For example a first certificate installed in a mobile wireless device can allow for replacement of a provisioning eSIM profile, while a second certificate installed in an Internet of Things (IoT) wireless device can allow for enabling and disabling eSIM profiles. An applicable certificate for a particular type of wireless device can be installed at a time of manufacture on the wireless device, e.g., on the eUICC of the wireless device. During an eSIM profile management session, the eUICC of the wireless device can check that the profile management server is authorized for one or more eSIM profile management operations commanded by the profile management server to the wireless device, e.g., in a profile management request message received by the wireless device. In some embodiments, the eUICC of the wireless device can disallow certain eSIM profile management operations requested by the profile management server based on a certificate associated with the profile management server installed on the eUICC of the wireless device.

Figure 1:
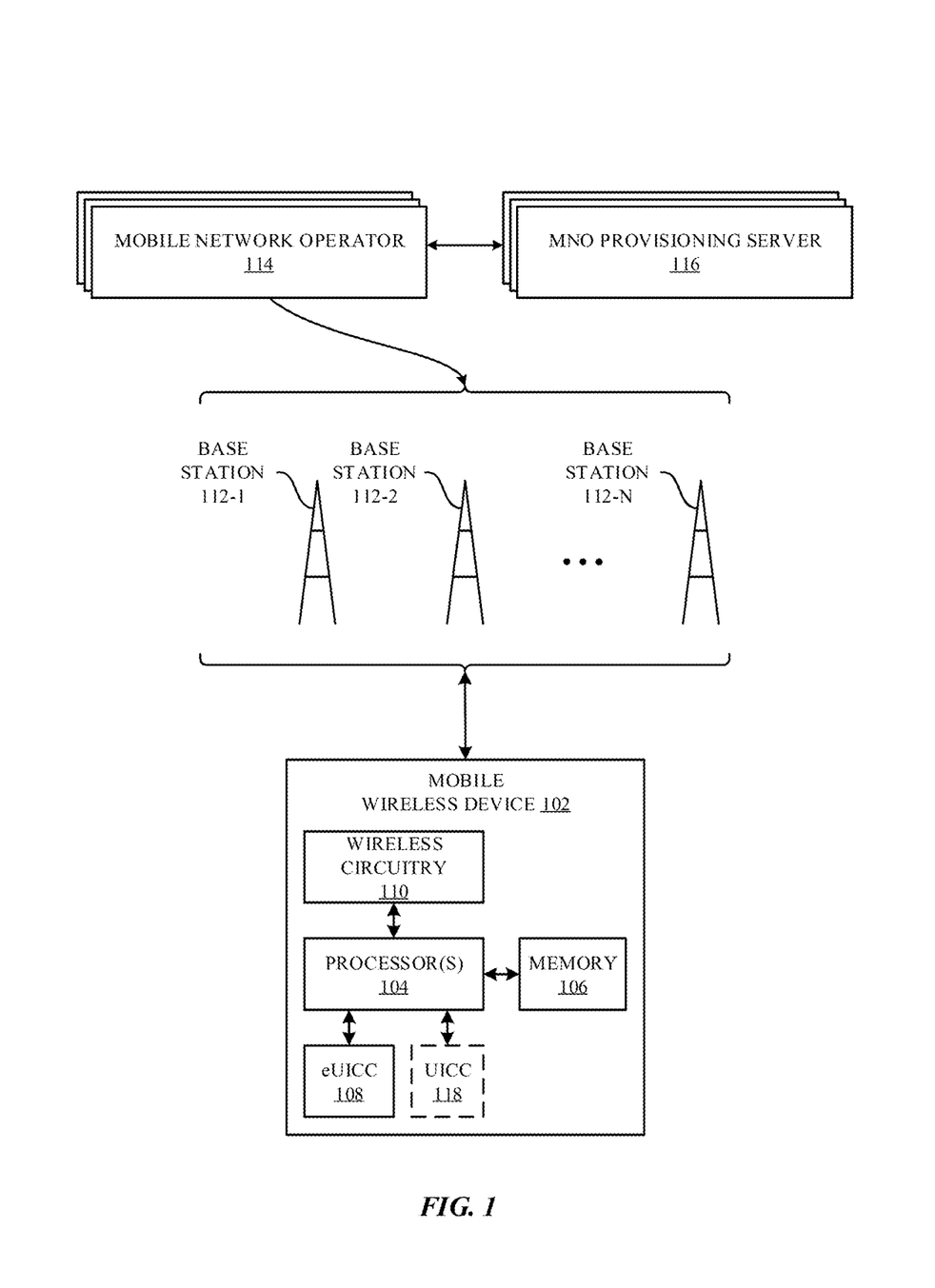
FIG. 1 illustrates a block diagram of different components of an exemplary system configured to implement the various techniques described herein, according to some embodiments.

These and other embodiments are discussed below with reference to FIGS. 1-5; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®) or a cellular-capable wearable device (e.g., an Apple Watch), the base stations 112-1 to 112-n can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO 114, an eSIM is reserved for subsequent download and installation to the eUICC 108. In some embodiments, the eUICC 108 obtains one or more eSIMs from one or more associated provisioning servers 116. The provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel. In some embodiments, one or more provisioning eSIM profiles are installed on the eUICC 108 of the wireless device 102 at a time of manufacture and subsequently at least one provisioning eSIM profile is replace on the eUICC 108 of the wireless device 102 after delivery to a user. Replacement of the at least one provisioning eSIM profile can be initiated by a profile management server (not shown) maintained by an OEM of the wireless device.

Figure 2:
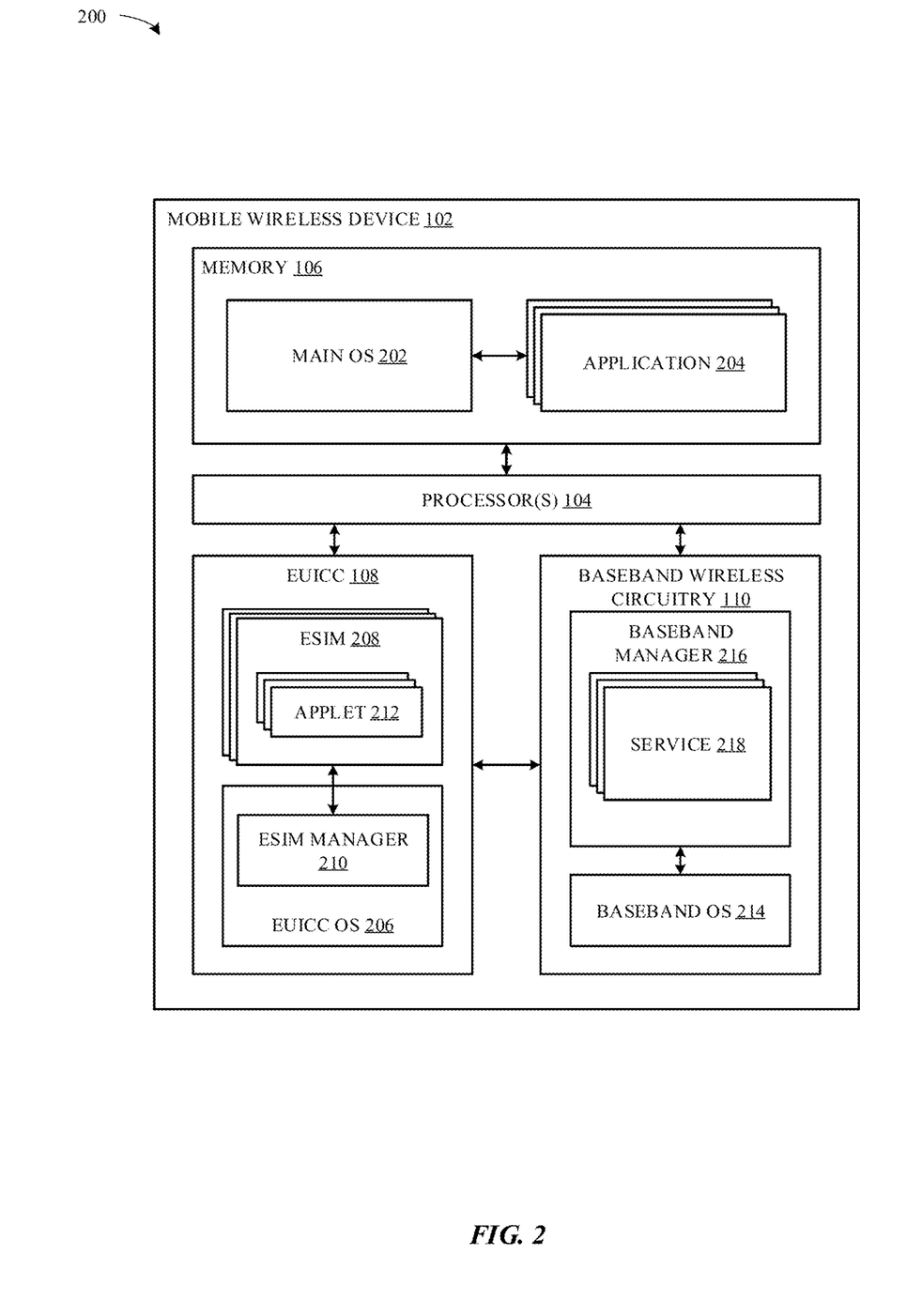
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

FIGS. 3A, 3B, 3C, 3D, and 3E illustrate diagrams 300, 330, 350, 370, 385 of an exemplary process to replace a provisioning eSIM profile 208 on an eUICC 108 of a wireless device 102. The process can include installation of PKI infrastructure components and replacement of a provisioning eSIM profile 208, including installation of a new provisioning eSIM profile 208 on the eUICC 108 of the wireless device 102 and subsequent deletion of a previously installed (old) provisioning eSIM profile 208 from the eUICC 108 of the wireless device 102. At 310, a certificate to verify signed messages received from the eUICC 108 of the wireless device 102 is installed on a profile management server 302. The certificate, e.g, CERT.CA.ECDSA, can be received from a certificate authority (CA) having a GSMA certificate issuer (CI) as a root of trust. At 312, a server cryptographic asymmetric key pair including a server public key, $PK_{server}$, and an associated server private (secret) key, $SK_{server}$, are installed on the profile management server 302. The server key pair can be associated with a certificate, e.g., APPLE.CA.ECDSA, provided by a CA that is specific to an OEM manufacturer of the wireless device 102, e.g., Apple Inc. Separately, at 314, a certificate and an associated server public key, $PK_{server}$, can be installed on the eUICC 108 of the wireless device 102, where the certificate and/or the server public key $PK_{server}$ can be used to verify signed messages received by the wireless device 102 from the profile management server 302. At 316, an eUICC cryptographic asymmetric key pair including an eUICC public key, $PK_{eUICC}$, and an eUICC private (secret) key, $SK_{eUICC}$, along with an associated certificate, e.g., CERT.EUICC.ECDSA, can be installed on the eUICC 108 of the wireless device 102. The eUICC private key $SK_{eUICC}$ can be used to generate signatures to allow the profile management server 302 to verify signed messages sent by the eUICC 108 to the profile management server 302. One or more provisioning eSIM profiles 208 and/or partially or fully functional eSIM profiles 208 can also be loaded on the eUICC 108 of the wireless device 102 prior to and/or in conjunction with shipment to an end user. The wireless device 102 that includes the eUICC 108 can be subsequently received, initialized, and operated by the end user.

Figure 3A:
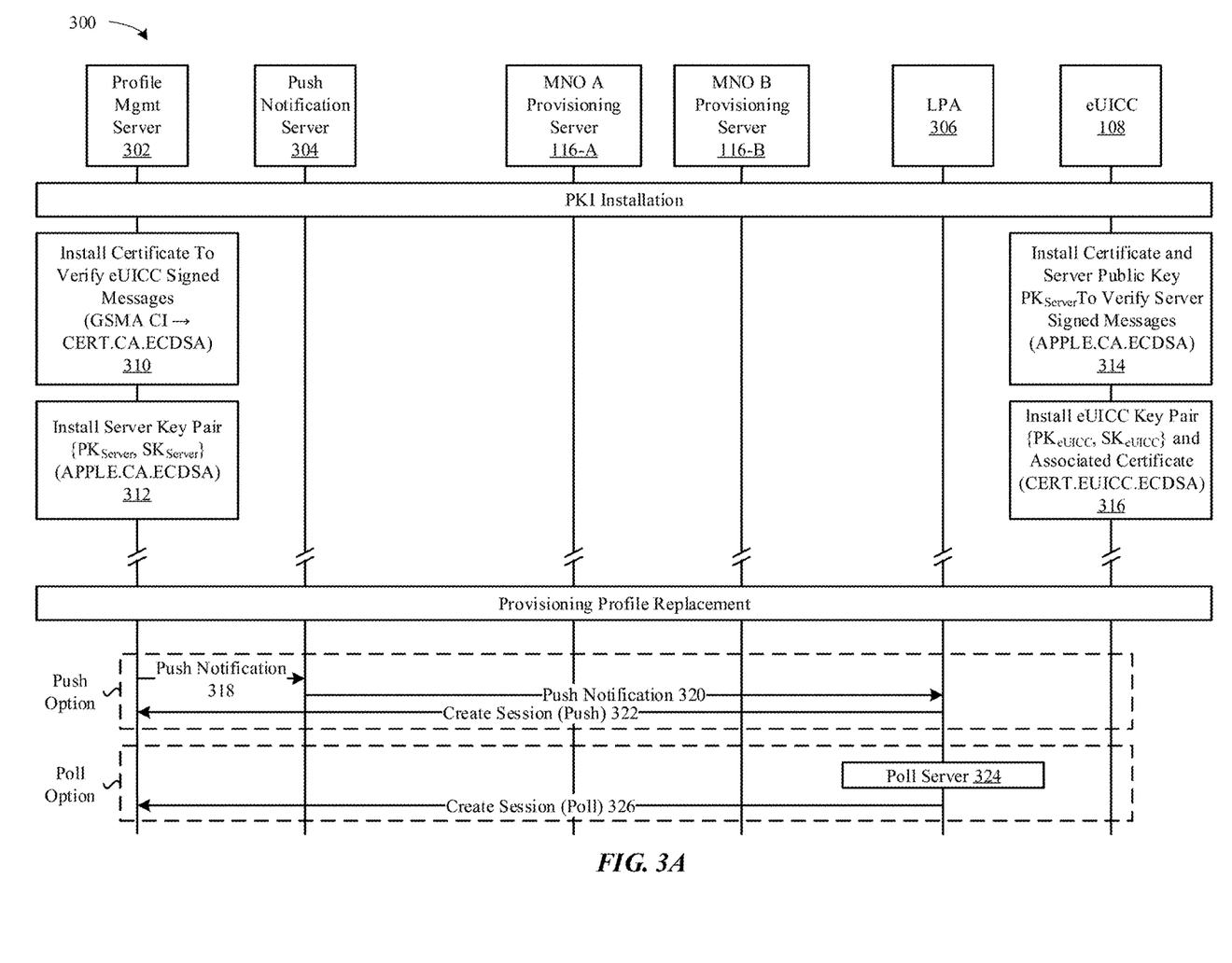
FIGS. 3A, 3B, 3C, 3D, and 3E illustrate diagrams of an exemplary process to replace a provisioning eSIM profile of a wireless device, according to some embodiments.

After deployment of the wireless device 102, the profile management server 302 can seek to manage at least one eSIM profile 208 installed on the eUICC 108 of the wireless device 102. In some embodiments, the profile management server 302 can seek to replace a provisioning eSIM profile 208 installed on the eUICC 108 of the wireless device 102 with another provisioning eSIM profile 208. Replacement of the provisioning eSIM profile 208 can include causing the wireless device 102 to obtain (download and install) a new provisioning eSIM profile 208 from a provisioning server 116 associated with a second MNO 114, e.g., MNO B provisioning server 116-B, and delete a previously installed eSIM profile 208 associated with a first MNO 114, e.g., with MNO A associated with MNO A provisioning server 116-A. Profile management operations to manage at least one eSIM profile 208 on the eUICC 108 of the wireless device 102 can be initiated based on a push notification received by the wireless device 102 or responsive to a poll of the profile management server 302 by the wireless device 102. Both a push option and a poll option are indicated in FIG. 3A. For the push option, at 318, the profile management server 302 sends a push notification message to a push notification server 304, which sends (or forwards), at 320, a push notification message to a local profile assistant (LPA) 306 operating on an application processor (AP) of the wireless device 102. The LPA 306, at 322, responds to the push notification message, by sending to the profile management server 302 a session initiation message, e.g., Create Session (Push), to establish an eSIM profile management session with the profile management server 302. For the poll option, at 324, the LPA 306 of the wireless device 102 is triggered (e.g., based on a timer or other mechanism) to send a session initiation message, e.g., Create Session (Poll), at 326, to the profile management server 302 to establish the eSIM profile management session.

Figure 3B:
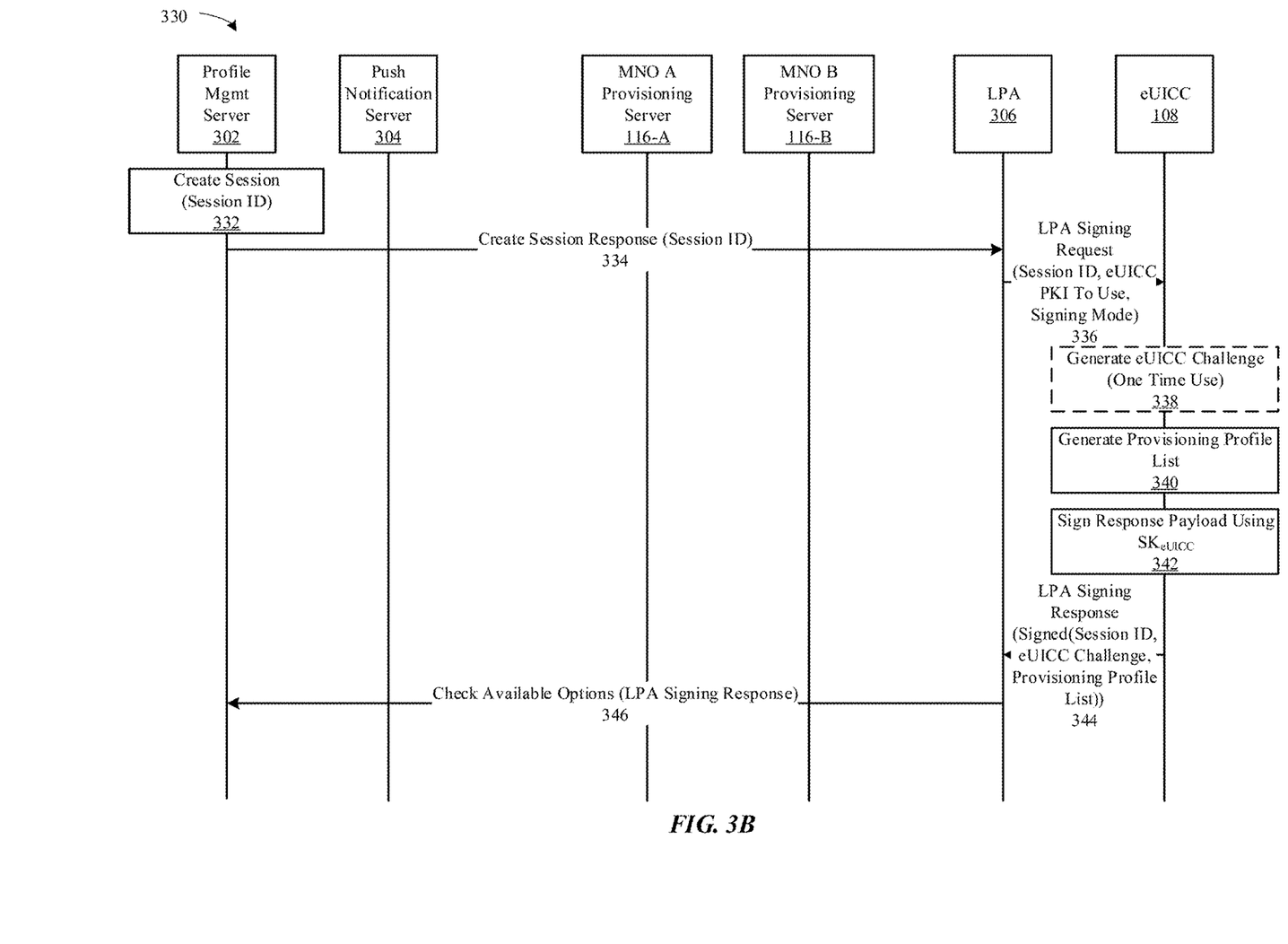
Figure 3C:
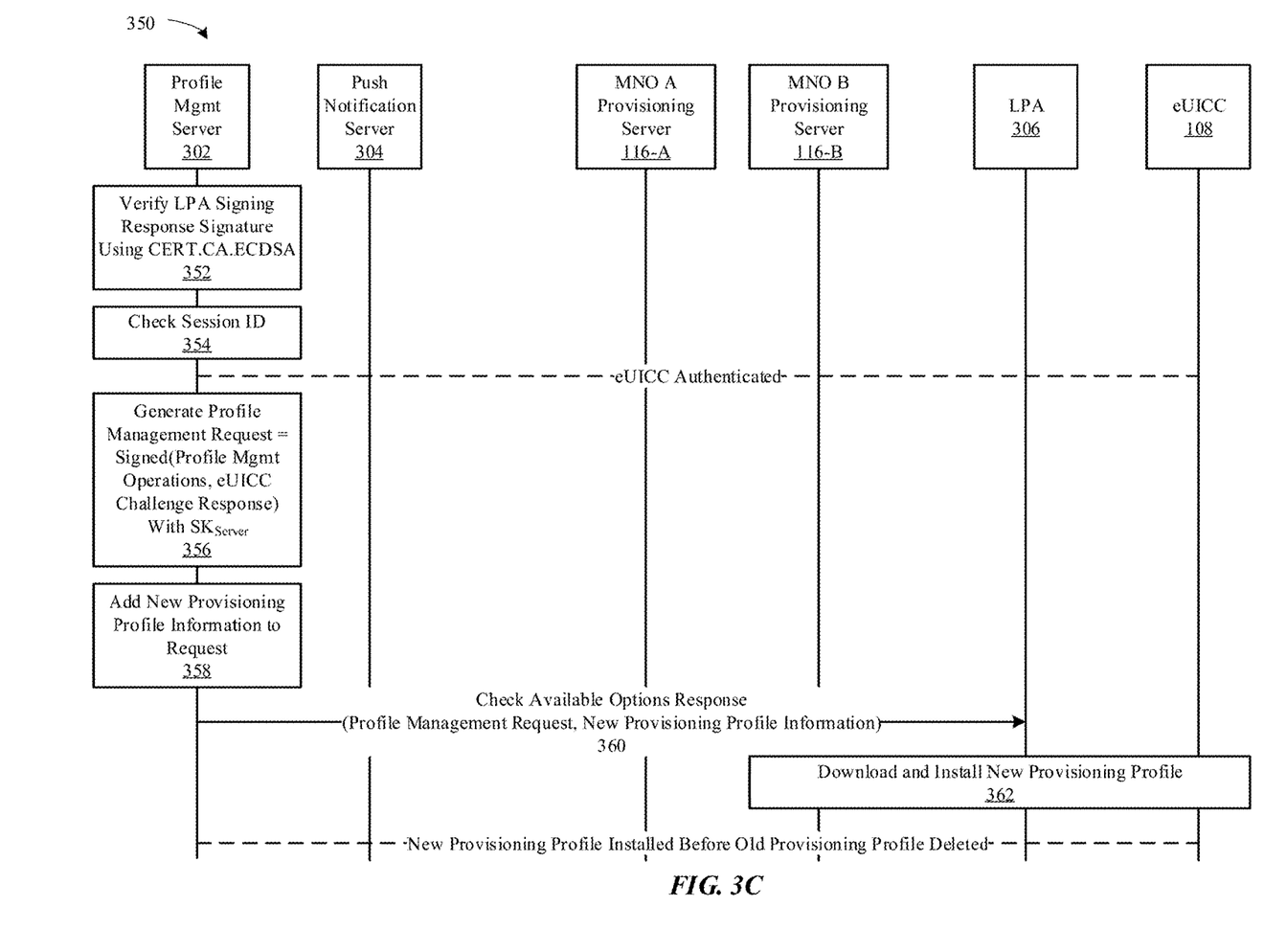

Responsive to the session initiation message received from the wireless device 102 to establish an eSIM profile management session, the profile management server 302, at 332, creates a one-time use session identifier (ID) value associated with the eSIM profile management session with the wireless device 102. At 334, the profile management server 302 sends, to the LPA 306 of the wireless device 102, a response message, e.g., Create Session Response, which includes the unique session ID value in the response message. After establishment of the eSIM profile management session, at 336, the LPA 306 of the wireless device 102 sends an LPA signing request message to the eUICC 108 that includes the unique session ID received from the profile management server 302 and an indication of eUICC PKI information to use for signing a payload of a messages to be sent to the profile management server 302. The LPA signing request message can also include an indication of a signing mode for the eUICC 108 to use when signing the payload of the message to be sent. In some embodiments, at 338, the eUICC 108 generates a one-time use eUICC challenge (e.g., when no eUICC challenge is already available to use). At 340, the eUICC 108 generates a list of one or more eSIM profiles 208 on the eUICC 108, e.g., a list of at least one provisioning eSIM profile 208 presently installed on the eUICC 108 of the wireless device 102. At 342, the eUICC 108 generates a signature for the response payload based on an eUICC private key, $SK_{eUICC}$, where the response payload includes the previously received session ID, the generated (or otherwise obtained) eUICC challenge, and the generated list of provisioning eSIM profiles 208. At 344, the eUICC 108 sends to the LPA 306 an LPA signing response message that includes the signed version of the response payload, e.g., the session ID, eUICC challenge, and provisioning eSIM profile list, accompanied by the generated signature. At 346, the LPA 306 forwards, to the profile management server 302, the LPA signing response message received from the eUICC 108 embedded in a profile message, e.g., Check Available Options (LPA signing response). At 352, the profile management server 302 verifies authenticity of the profile message received from the wireless device 102 using a previously installed certificate, e.g., CERT.CA.ECDSA. At 354, the profile management server 302 checks that the session ID included in the profile management request message matches the previously sent session ID created when establishing the eSIM profile management session with the wireless device 102. Upon verification of the profile management request message and session ID, the profile management server 302 can conclude that the eUICC 108 of the wireless device 102 is authenticated.

At 356, the profile management server 302 generates a profile management response message that i) includes an indication of one or more profile management operations to be applied to at least one eSIM profile 208 on the eUICC 108 of the wireless device 102, ii) an eUICC challenge response (based on the eUICC challenge received in the profile message from the eUICC 108 of the wireless device 102), and iii) a signature generated using the server private key $SK_{server}$. In some embodiments, the one or more profile management operations include replacement of an existing provisioning eSIM profile 208 with a new provisioning eSIM profile 208 on the eUICC 108 of the wireless device 102. In some embodiments, the profile management server, at 358, includes with the profile management request message information for the eUICC 108 and/or the LPA 306 of the wireless device 102 to use to obtain the new provisioning eSIM profile 208. At 360, the profile management server 302 sends to the LPA 306 of the wireless device 102 a message that includes the profile management response and optionally, e.g., when replacement of one or more provisioning eSIM profiles 208 is to occur, new provisioning eSIM profile 208 information, such as addresses for one or more provisioning servers 116 from which to obtain a new provisioning eSIM profile 208. At 362, the wireless device 102 downloads from an MNO provisioning server 116, e.g., MNO B provisioning server 116-B, a new provisioning eSIM profile 208 and installs the new provisioning eSIM profile 208 on the eUICC 108 of the wireless device 102. Notably, the new provisioning eSIM profile 208 is installed on the eUICC 108 of the wireless device 102 before deletion of the previously installed (old) provisioning eSIM profile 208 occurs.

Figure 3D:
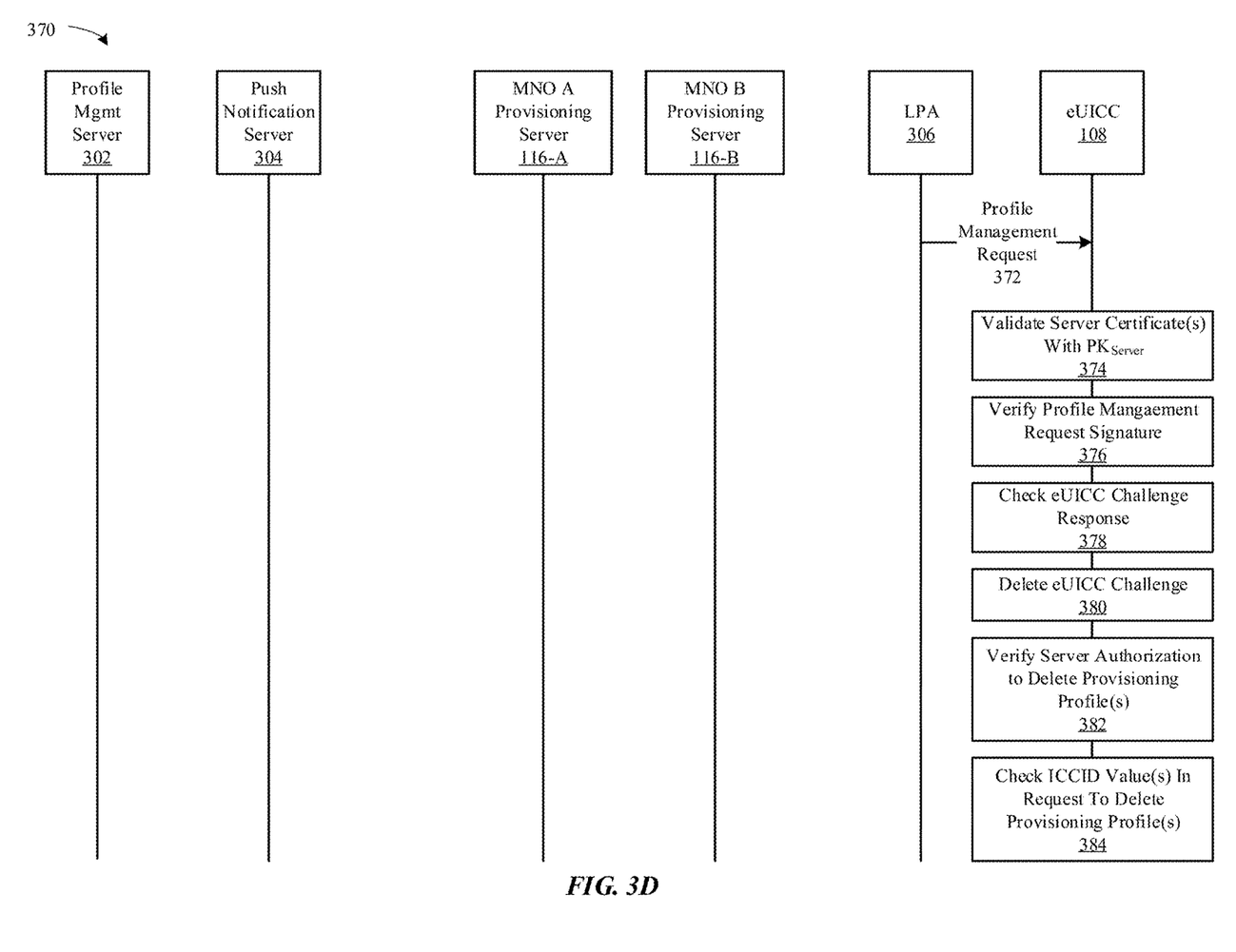
Figure 3E:
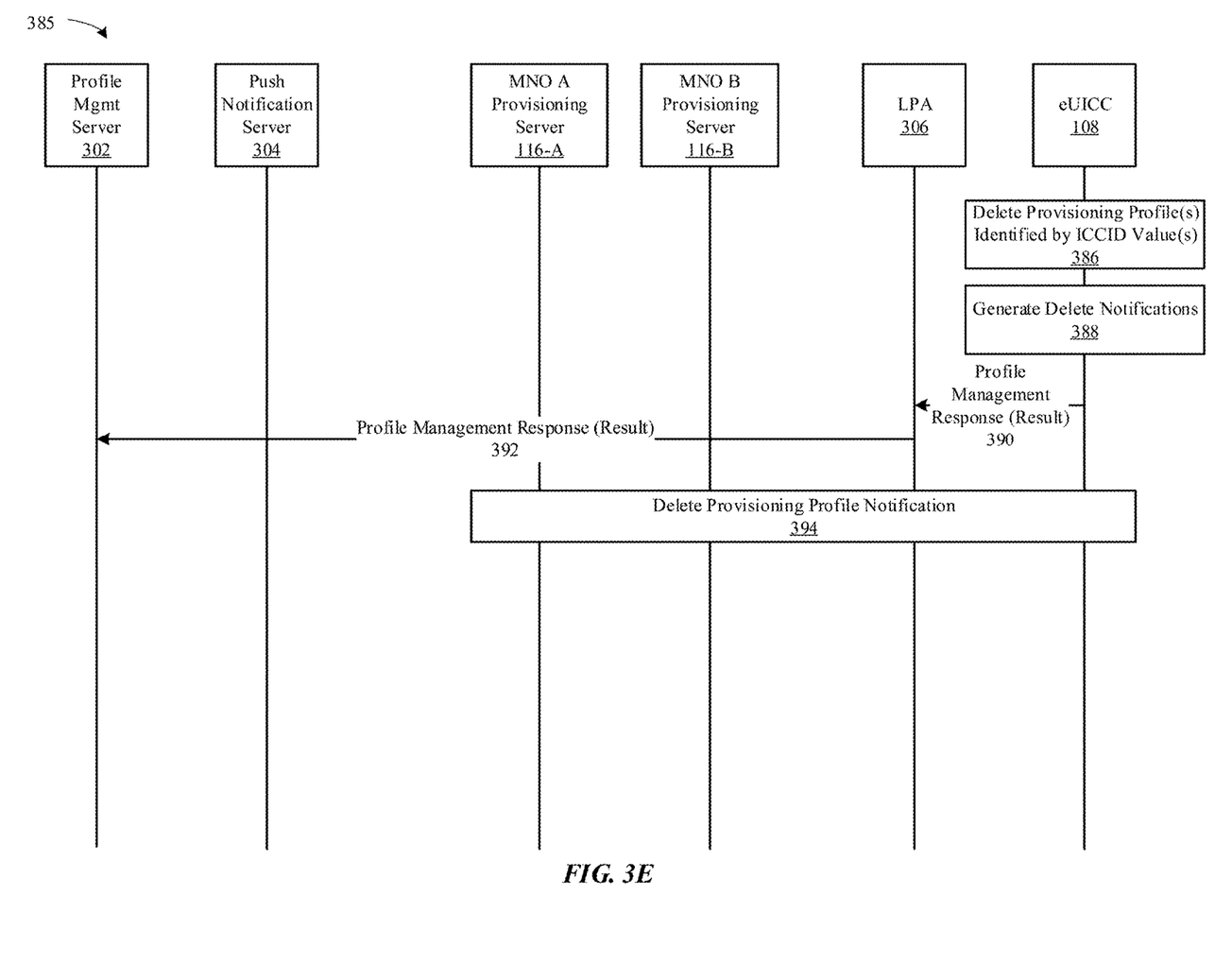

At 372, the LPA 306 forwards the profile management request from the message received at 360 to the eUICC 108. At 374, the eUICC 108 validates one or more server certificates using the server public key $PK_{server}$. At 376, the eUICC 108 verifies the signature included with the profile management request, e.g., using the server public key $PK_{server}$. At 378, the eUICC 108 checks the eUICC challenge response received from the profile management server 302. When validation, at 374, verification, at 376, and checking, at 378, are successful, the eUICC 108 concludes that the profile management request received from the profile management server 302 is authenticated. At 380, the eUICC 108 deletes the previously used eUICC challenge. At 382, the eUICC 108 verifies, using a server certificate previously installed on the eUICC 108 at 314, whether the profile management server 302 is authorized to perform (or command the eUICC 108 to perform) one or more of the profile management operations indicated in the profile management request. The eUICC 108 can determine whether the server certificate includes one or more fields having values that indicate authorization of the profile management server 302 for the indicated profile management operations. In some embodiments, the profile management operations include replacement of an provisioning eSIM profile 208 on the eUICC 108, e.g., which can include installation of a new provisioning eSIM profile 208 and deletion of one or more previously installed provisioning eSIM profiles 208 on the eUICC 108 of the wireless device 102. At 384, the eUICC 108 can verify that ICCID values indicated in the profile management request for eSIM profiles on the eUICC 108, on which profile management operations are to be performed by the eUICC 108, correspond to installed eSIM profiles 208 on the eUICC 108 of the wireless device 102. When validation, verification, and checking, e.g., at 374 to 384, are successful, the eUICC 108, at 386, can perform the profile management operations, e.g., delete one or more provisioning eSIM profiles 208 identified by ICCID values in the profile management request from the eUICC 108 of the wireless device 102. At 388, the eUICC 108 generates one or more deletion notifications corresponding to the provisioning eSIM profiles 208 deleted from the eUICC 108 of the wireless device 102. At 390, the eUICC 108 sends to the LPA 306 a profile management response message that includes a result of the application of the profile management commands at the eUICC 108. For example, the result included in the profile management response message can indicate successful (or unsuccessful) deletion of one or more provisioning eSIM profiles 208. In some embodiments, such as when the profile management commands relate to enabling or disabling eSIM profiles 208 on the eUICC 108, the result can indicate successful (or unsuccessful) enablement or disablement of one or more eSIM profiles 208 on the eUICC 108 of the wireless device 102. At 392, the LPA 306 forwards the profile management response message including the result of the application (or lack thereof) of the profile management commands to the profile management server 302. At 394, the eUICC 108 and/or the LPA 306 communicates, to applicable MNO provisioning servers 116, e.g., to MNO A provisioning server 116-A, one or more notifications indicating deletion of one or more provisioning eSIM profiles 208 from the eUICC 108 of the wireless device 102.

In some embodiments, validation, verification, and/or checking of one or more elements of the profile management request received from the profile management server 302 by the eUICC 108, such as at 374, 376, 378, 382, and/or 384, can occur before installation of a new provisioning eSIM profile 208 on the eUICC 108 of the wireless device 102. In some embodiments, installation of the new provisioning eSIM profile 208, at 362, can occur after the operations at 372 to 384, and before deletion of the previously installed (old) provisioning eSIM profile 208, at 386, occurs. In some embodiments, deletion of one or more installed (old) provisioning eSIM profiles 208 occurs without installation of a new provisioning eSIM profile 208 on the eUICC 108 of the wireless device 102.

The process illustrated in FIGS. 3A to 3E regards replacement of a provisioning eSIM profile 208 on an eUICC 108 of a wireless device 102, as a specific example of eSIM profile 208 management. Deployment of appropriate server PKI information in an OEM-maintained profile management server 302 and in an eUICC 108 of a wireless device 102 can be used during subsequent profile management sessions to verify and validate various profile management operations commanded by the profile management server 302 to the eUICC 108 of the wireless device 102.

Figure 4:
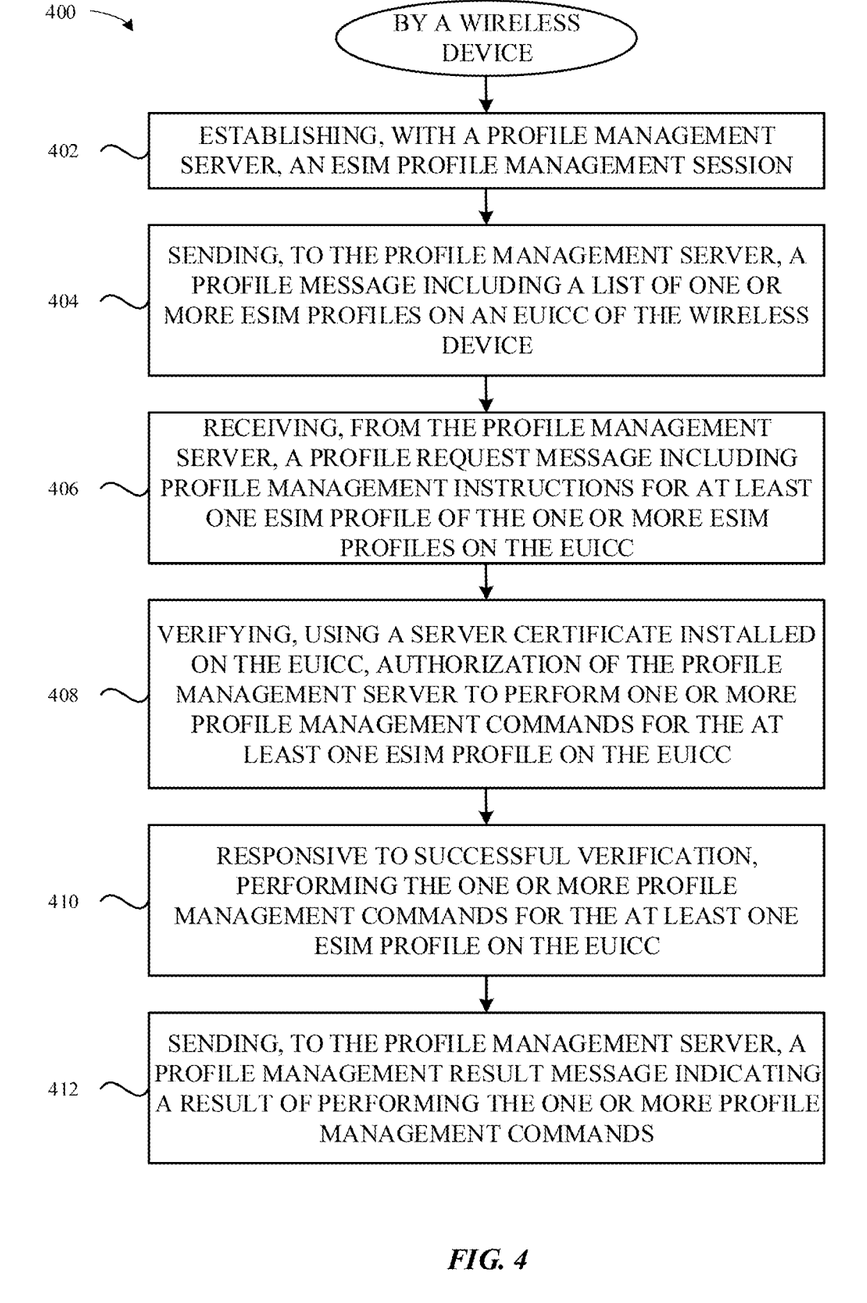
FIG. 4 illustrates a flowchart of an exemplary method to manage one or more eSIM profiles of a wireless device, according to some embodiments.

FIG. 4 illustrates a flowchart 400 of an exemplary method to manage one or more eSIM profiles 208 on an eUICC 108 of a wireless device 102. At 402, the wireless device 102 establishes an eSIM profile management session with a profile management server 302. At 404, the wireless device 102 sends, to the profile management server 302, a profile message that includes a list of one or more eSIM profiles 208 on the eUICC 108 of the wireless device 102. In some embodiments, the list of one or more eSIM profiles 208 encompasses all eSIM profiles 208 installed on the eUICC 108 of the wireless device 102. In some embodiments, the list of one or more eSIM profiles 208 includes only a subset of eSIM profiles 208 to be managed. At 406, the wireless device 102 receives, from the profile management server 302, a profile request message that includes profile management instructions for at least one eSIM profile 208 of the one or more eSIM profiles 208 on the eUICC 108 of the wireless device 102. At 408, the wireless device 102 verifies, using a server certificate installed on the eUICC 108, authorization of the profile management server 302 to perform (or cause the eUICC 108 to perform) one or more profile management commands for the at least one eSIM profile 208 on the eUICC 108 of the wireless device 102. At 410, the wireless device 102, responsive to successful verification, performs the one or more profile management commands for the at least one eSIM profile 208 on the eUICC 108 of the wireless device 102. At 412, the wireless device 102 sends, to the profile management server 302, a profile management result message that indicates a result of performing the one or more profile management commands.

In some embodiments, the server certificate is installed on the eUICC 108 of the wireless device 102 at a time of manufacture of the wireless device 102. In some embodiments, a device manufacturer of the wireless device 102 maintains the profile management server 302. In some embodiments, the server certificate includes one or more fields that indicate profile management commands authorized for the profile management server 302. In some embodiments, the one or more profile management commands performed by the wireless device 102 include replacement of at least one provisioning eSIM profile on the eUICC 108 of the wireless device 102. In some embodiments, performing the one or more profile management commands for the at least one eSIM profile 208 on the eUICC 108 includes: i) installing a new provisioning eSIM profile 208 on the eUICC 108, and after installation of the new provisioning eSIM profile 208 on the eUICC 108, deleting a previously installed provisioning eSIM profile 208 from the eUICC 108. In some embodiments, the new provisioning eSIM profile 208 and the previously installed provisioning eSIM profile 208 are associated with distinct MNOs 114. In some embodiments, the wireless device 102 validates the server certificate installed on the eUICC 108 using a server public key $PK_{server}$ installed on the eUICC 108 at a time of manufacture of the wireless device 102. In some embodiments, the profile message includes a session identifier (ID), provided by the profile management server 302 to the wireless device 102 when establishing the eSIM profile management session, and a signature generated by the eUICC 108 of the wireless device 102 based on an eUICC private key, $SK_{eUICC}$, installed on the eUICC 108 at a time of manufacture of the wireless device 102. In some embodiments, the session ID and signature included in the profile message verify authenticity of the eUICC 108 to the profile management server 302. In some embodiments, the profile management request message includes a signature generated by the profile management server 302 using a server private key, $SK_{server}$. In some embodiments, the wireless device 102 verifies the signature included in the profile management request message using a corresponding public key, $PK_{server}$, installed on the eUICC 108 at a time of manufacture of the wireless device 102. In some embodiments, the profile message sent by the wireless device 102 to the profile management server 302 includes a challenge generated by the eUICC 108. In some embodiments, the profile management request message received by the wireless device 102 from the profile management server 302 includes a challenge response generated by the profile management server 302 based on the challenge received from the wireless device 102 in the profile message. In some embodiments, the wireless device 102 verifies the challenge response to authenticate the profile management request message received from the profile management server.

Figure 5:
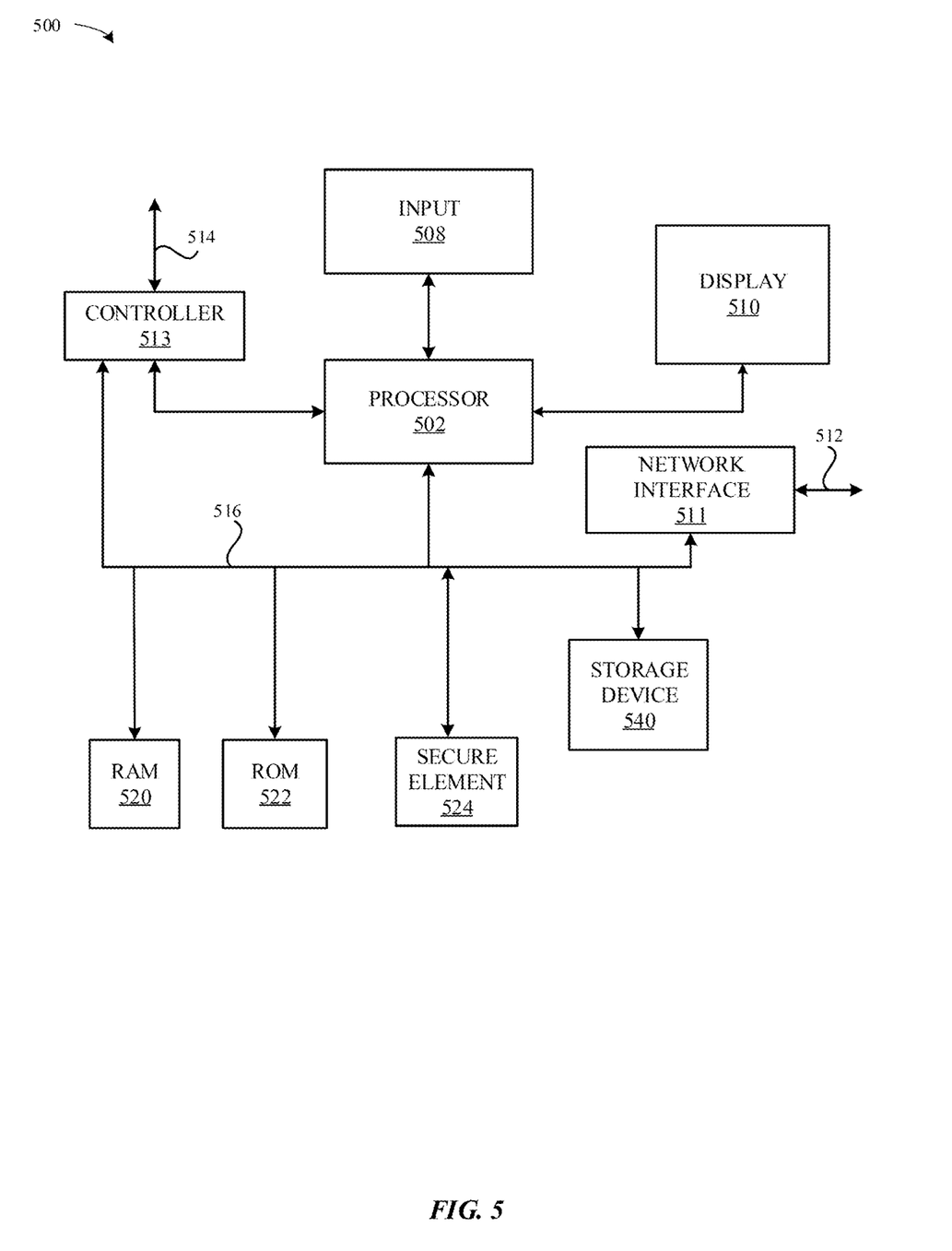
FIG. 5 illustrates a block diagram of exemplary elements of a mobile wireless device, according to some embodiments.

FIG. 5 illustrates a detailed view of a representative computing device 500 that can be used to implement various methods described herein, according to some embodiments. In particular, the detailed view illustrates various components that can be included in the mobile wireless device 102. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 that can be controlled by the processor 502 to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that communicatively couples to a data link 512. In the case of a wireless connection, the network/bus interface 511 can include a wireless transceiver.

The computing device 500 also includes a storage device 540, which can comprise a single disk or a plurality of disks (e.g., hard drives), and includes a storage management module that manages one or more partitions within the storage device 540. In some embodiments, storage device 540 can include flash memory, semiconductor (solid state) memory or the like. The computing device 500 can also include a Random Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 500. The computing device 500 further includes a secure element 524, which can include an eUICC 108 on which to store one or more eSIMs 208 and/or a UICC 118 (physical SIM card).

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing one or more electronic subscriber identity module (eSIM) profiles on a wireless device, the method comprising:
by the wireless device:
establishing, with a profile management server, an eSIM profile management session;
sending, to the profile management server, a profile message including a list of the one or more eSIM profiles on an embedded universal integrated circuit card (eUICC) of the wireless device;
receiving, from the profile management server, a profile management request message including profile management instructions to replace a previously installed provisioning eSIM profile of the one or more eSIM profiles with a new provisioning eSIM profile, wherein:
the previously installed provisioning eSIM profile is associated with a first mobile network operator (MNO);
the new provisioning eSIM profile is associated with a second MNO; and
the profile management request message includes a network address for a provisioning server associated with the second MNO from which to download the new provisioning eSIM profile;
verifying, using a server certificate installed on the eUICC, authorization of the profile management server to replace the previously installed provisioning eSIM profile of the one or more eSIM profiles on the eUICC; and
responsive to successful verification, performing replacement of the previously installed provisioning eSIM profile on the eUICC by at least:
downloading from the provisioning server associated with the second MNO the new provisioning eSIM profile;
installing on the eUICC the new provisioning eSIM profile; and
subsequently deleting from the eUICC the previously installed provisioning eSIM profile associated with the first MNO;
sending, to the profile management server, a profile management result message indicating successful replacement of the previously installed provisioning eSIM profile with the new provisioning eSIM profile; and
sending to a provisioning server associated with the first MNO an indication of deletion of the previously installed provisioning eSIM profile from the eUICC of the wireless device.

2. The method of claim 1, wherein:
the server certificate is installed on the eUICC at a time of manufacture of the wireless device; and
the profile management server is maintained by a device manufacturer of the wireless device.

3. The method of claim 1, wherein the server certificate includes one or more fields that indicate one or more profile management commands authorized for the profile management server.

4. The method of claim 3, wherein the one or more profile management commands include replacement of at least one provisioning eSIM profile on the eUICC of the wireless device.

5. The method of claim 1, further comprising:
by the wireless device:
validating the server certificate installed on the eUICC using a server public key $PK_{server}$ installed on the eUICC at a time of manufacture of the wireless device.

6. The method of claim 1, wherein:
the profile message includes a session identifier (ID), provided by the profile management server when establishing the eSIM profile management session, and a signature generated by the eUICC of the wireless device based on an eUICC private key, $SK_{eUICC}$, installed on the eUICC at a time of manufacture of the wireless device; and
the session ID and signature verify authenticity of the eUICC to the profile management server.

7. The method of claim 1, wherein:
the profile management request message includes a signature generated by the profile management server using a server private key, $SK_{server}$; and
the method further includes the wireless device verifying the signature using a corresponding public key, $PK_{server}$, installed on the eUICC at a time of manufacture of the wireless device.

8. The method of claim 1, wherein:
the profile message includes a challenge generated by the eUICC;
the profile management request message includes a challenge response generated by the profile management server based on the challenge; and
the method further includes verifying the challenge response to authenticate the profile management request message.

9. A wireless device comprising:
wireless circuitry including one or more antennas; and
processing circuitry communicatively coupled to the wireless circuitry, the processing circuitry comprising an application processor (AP), an embedded universal integrated circuit card (eUICC), and at least one storage element storing instructions that when executed by the processing circuitry cause the wireless device to:
  establish, with a profile management server, an electronic subscriber identity module (eSIM) profile management session;
  send, to the profile management server, a profile message including a list of the one or more eSIM profiles on the eUICC of the wireless device;
  receive, from the profile management server, a profile management request message including profile management instructions to replace a previously installed provisioning eSIM profile of the one or more eSIM profiles with a new provisioning eSIM profile, wherein:
    the previously installed provisioning eSIM profile is associated with a first mobile network operator (MNO);
    the new provisioning eSIM profile is associated with a second MNO; and
    the profile management request message includes a network address for a provisioning server associated with the second MNO from which to download the new provisioning eSIM profile;
  verify, using a server certificate installed on the eUICC, authorization of the profile management server to replace the previously installed provisioning eSIM profile on the eUICC;
  responsive to successful verification, perform replacement of the previously installed provisioning eSIM profile on the eUICC by at least:
    downloading from the provisioning server associated with the second MNO the new provisioning eSIM profile;
    installing on the eUICC the new provisioning eSIM profile; and
    subsequently deleting from the eUICC the previously installed provisioning eSIM profile associated with the first MNO; and
  send, to the profile management server, a profile management result message indicating successful replacement of the previously installed provisioning eSIM profile with the new provisioning eSIM profile; and
  send, to a provisioning server associated with the first MNO an indication of deletion of the previously installed provisioning eSIM profile from the eUICC of the wireless device.

10. The wireless device of claim 9, wherein:
the server certificate is installed on the eUICC at a time of manufacture of the wireless device; and
the profile management server is maintained by a device manufacturer of the wireless device.

11. The wireless device of claim 9, wherein the server certificate includes one or more fields that indicate one or more profile management commands authorized for the profile management server.

12. The wireless device of claim 11, wherein the one or more profile management commands include replacement of at least one provisioning eSIM profile on the eUICC of the wireless device.

13. The wireless device of claim 9, wherein the wireless device is further configured to:
validate the server certificate installed on the eUICC using a server public key $PK_{server}$ installed on the eUICC at a time of manufacture of the wireless device.

14. The wireless device of claim 9, wherein:
the profile message includes a session identifier (ID), provided by the profile management server when establishing the eSIM profile management session, and a signature generated by the eUICC of the wireless device based on an eUICC private key, $SK_{eUICC}$, installed on the eUICC at a time of manufacture of the wireless device; and
the session ID and signature verify authenticity of the eUICC to the profile management server.

15. The wireless device of claim 9, wherein:
the profile management request message includes a signature generated by the profile management server using a server private key, $SK_{server}$; and
the wireless device is further configured to verify the signature using a corresponding public key, $PK_{server}$, installed on the eUICC at a time of manufacture of the wireless device.

16. The wireless device of claim 9, wherein:
the profile message includes a challenge generated by the eUICC;
the profile management request message includes a challenge response generated by the profile management server based on the challenge; and
the wireless device is further configured to verify the challenge response to authenticate the profile management request message.

17. A non-transitory computer readable medium storing instructions that, when executed by one or more processors of a wireless device, cause the wireless device to:
establish, with a profile management server, an electronic subscriber identity module (eSIM) profile management session;
send, to the profile management server, a profile message including a list of the one or more eSIM profiles on an embedded universal integrated circuit card (eUICC) of the wireless device;
receive, from the profile management server, a profile management request message including profile management instructions to replace a previously installed provisioning eSIM profile of the one or more eSIM profiles with a new provisioning eSIM profile, wherein:
  the previously installed provisioning eSIM profile is associated with a first mobile network operator (MNO);
  the new provisioning eSIM profile is associated with a second MNO; and
  the profile management request message includes a network address for a provisioning server associated with the second MNO from which to download the new provisioning eSIM profile;

verify, using a server certificate installed on the eUICC, authorization of the profile management server to replace the previously installed provisioning eSIM profile on the eUICC;

responsive to successful verification, perform replacement of the previously installed provisioning eSIM profile on the eUICC by at least:

downloading from the provisioning server associated with the second MNO the new provisioning eSIM profile;

installing on the eUICC the new provisioning eSIM profile; and     subsequently deleting from the eUICC the previously installed provisioning eSIM profile associated with the first MNO; and send, to the profile management server, a profile management result message indicating successful replacement of the previously installed provisioning eSIM profile with the new provisioning eSIM profile; and send, to a provisioning server associated with the first MNO an indication of deletion of the previously installed provisioning eSIM profile from the eUICC of the wireless device.

18. The non-transitory computer readable medium of claim 17, the server certificate is installed on the eUICC at a time of manufacture of the wireless device; and     the profile management server is maintained by a device manufacturer of the wireless device.

19. The non-transitory computer readable medium of claim 17, wherein the server certificate includes one or more fields that indicate one or more profile management commands authorized for the profile management server.

20. The non-transitory computer readable medium of claim 19, wherein the one or more profile management commands include replacement of at least one provisioning eSIM profile on the eUICC of the wireless device.

\* \* \* \* \*